No. 840,404. PATENTED JAN. 1, 1907.
A. T. WESTLAKE.
CULTIVATOR.
APPLICATION FILED APR. 5, 1906.
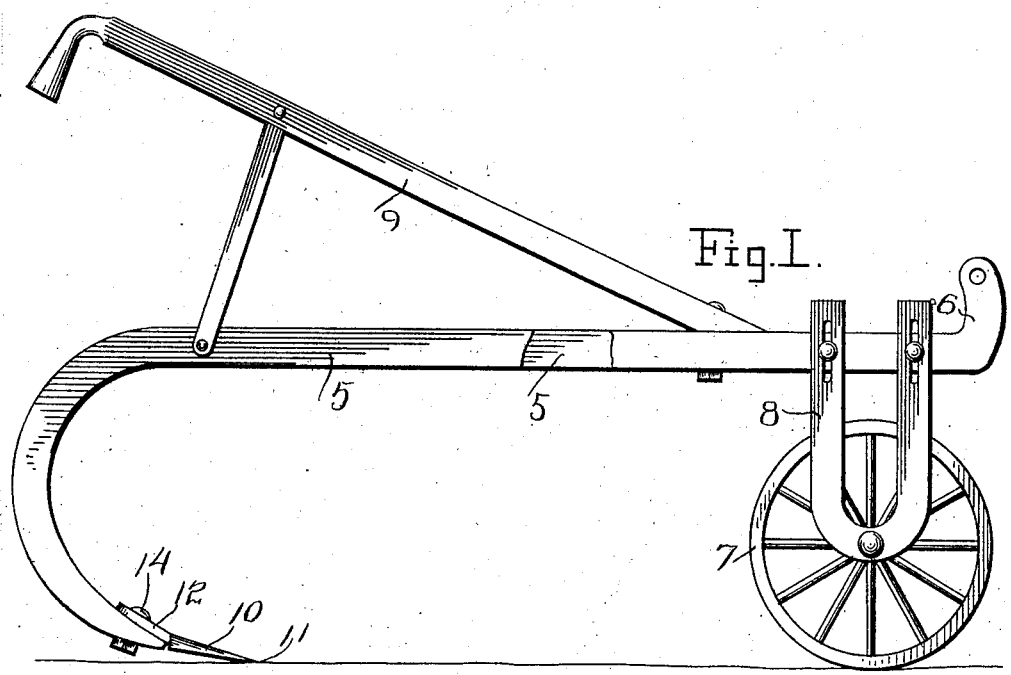
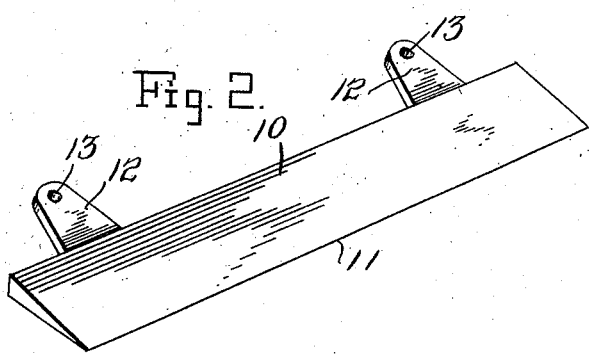

UNITED STATES PATENT OFFICE.

ALFRED T. WESTLAKE, OF NEWBURGH, NEW YORK.

CULTIVATOR.

No. 840,404.

Specification of Letters Patent.

Patented Jan. 1, 1907.

Application filed April 5, 1906. Serial No. 310,165.

*To all whom it may concern:*

Be it known that I, ALFRED T. WESTLAKE, a citizen of the United States, residing at Newburgh, in the county of Orange, State of New York, have invented certain new and useful Improvements in Cultivators; and I do hereby declare the following to be a full, clear, and exact description of the invention, such as will enable others skilled in the art to which it appertains to make and use the same.

This invention relates to weeder-blades of that class which are designed for attachment to a two-shovel cultivator after the shovels have been removed; and the object of the invention is to provide such a blade which will not in any degree obstruct the passage of the weeder over the ground.

The primary feature of the invention lies in the fact that the ears of the blade extend rearwardly and upwardly therefrom at an obtuse angle, with their upper faces flush with the upper faces of the blade and their lower faces spaced from the under face of the blade, the said ears being adapted to be secured to the upper face of the blade-standards, so that the under face of the blade-standards will form substantially a continuation of the under face of the blade proper, there being thus presented a blade having an unobstructed upper and under face.

In the accompanying drawings, Figure 1 is a side elevation of a cultivator, showing my blade attached thereto. Fig. 2 is a detail perspective view of the blade removed from the cultivator.

Referring more specifically to the drawings, the numeral 5 denotes the shovel-beams of a cultivator, which diverge rearwardly and are connected at their forward ends and upturned, as at 6. The said beams are supported at their forward connected ends by means of a gage-wheel 7, carried by a U-shaped frame 8, which is secured to the united ends of the beams in any suitable manner, and extending upwardly and rearwardly from the said beams at their forward ends are handles 9 of the usual construction.

The invention proper comprises a blade 10, provided at one of its longitudinal edges with a knife-edge 11, the said blade being preferably a plane one. Secured to or formed integral with the blade at its longitudinal edge opposite its knife-edge 11 are ears 12, which are located upon the blade at such a distance apart that they will register with the downturned ends of the shovel-beams 5. The said ears 12 extend upwardly and rearwardly from the blade at an obtuse angle thereto and are apertured, as at 13, for the passage of the shovel-attaching bolts 14, which serve to connect the said blade with the shovel-beams of the cultivator, it being understood that the extension of the ears at an angle from the blade holds the same in proper relation with respect to the ground to more readily cut the weeds.

What is claimed is—

In a weeder, the combination with a frame including a pair of blade-standards, said standards having their lower ends tapered, of a blade having ears formed integral with its rear edge and extending rearwardly therefrom and upwardly at an obtuse angle thereto, the upper face of the ears being flush with the upper face of the blade and the under face of the ears being spaced from the under face of the blade, said ears being secured upon the lower ends of the blade-standards with the under faces of the standards flush with the under faces of the blades whereby the blade will present an unobstructed upper and under face.

In testimony whereof I affix my signature in presence of two witnesses.

ALFRED T. WESTLAKE.

Witnesses:
L. W. Y. McCROSKERY,
MAUD L. BRUNDAGE.